US011905648B2

(12) United States Patent
Fisher et al.

(10) Patent No.: US 11,905,648 B2
(45) Date of Patent: Feb. 20, 2024

(54) METALIZED FABRIC THAT DISSIPATES AND SCATTERS INFRARED LIGHT AND METHODS OR MAKING AND USING THE SAME

(71) Applicant: Noble BioMaterials, Inc., Scranton, PA (US)

(72) Inventors: Bennett Fisher, Morganton, NC (US); Carl Jones, Peckville, PA (US); Jodi Wallis, Carbondale, PA (US); Dino Aimino, Newark, NY (US); Thomas Dougal, Old Forge, PA (US); Greg Gianforcaro, Clemson, NC (US); David Curry, Valdese, NC (US)

(73) Assignee: Noble BioMaterials, Inc., Scranton, PA (US)

( * ) Notice: Subject to any disclaimer, the term of this patent is extended or adjusted under 35 U.S.C. 154(b) by 0 days.

(21) Appl. No.: 17/161,364

(22) Filed: Jan. 28, 2021

(65) Prior Publication Data

US 2021/0246606 A1 Aug. 12, 2021

Related U.S. Application Data

(60) Provisional application No. 62/966,855, filed on Jan. 28, 2020.

(51) Int. Cl.
*D06M 11/83* (2006.01)
*B05D 5/06* (2006.01)
(Continued)

(52) U.S. Cl.
CPC ............ *D06M 11/83* (2013.01); *B05D 5/067* (2013.01); *D03D 1/007* (2013.01); *D03D 1/0047* (2013.01);
(Continued)

(58) Field of Classification Search
None
See application file for complete search history.

(56) References Cited

U.S. PATENT DOCUMENTS 4,681,591 A * 7/1987 Okayasu ................ D06M 11/83 8/115.68
4,925,706 A 5/1990 Kistrup et al.
(Continued)

FOREIGN PATENT DOCUMENTS

CN 107268214 A 10/2017
JP 2007146339 A 6/2007
(Continued)

OTHER PUBLICATIONS

International Search Report and Written Opinion in PCT/US2021/047319, dated Dec. 15, 2021, 13 pages.
(Continued)

*Primary Examiner* — Michael P. Rodriguez
(74) *Attorney, Agent, or Firm* — Lewis Rice LLC

(57) ABSTRACT

A metalized fabric and method for metallization of fabric. The fabric is formed using two threads with different affinities for metallization, but which threads are not metalized prior to forming into the fabric. The threads will typically be woven using an unbalanced weave to provide one side of the fabric with a resultant greater amount of metallization than the other but this is not required. Once the resultant fabric is metalized, it will typically be more suitable for consistent color dying than fabric which was formed from both metalized and unmetallized threads.

10 Claims, 2 Drawing Sheets

(51) Int. Cl.

| | |
|---|---|
| ***F41H 3/02*** | (2006.01) |
| ***D03D 15/283*** | (2021.01) |
| ***D03D 1/00*** | (2006.01) |

(52) U.S. Cl.
CPC ............. *D03D 15/283* (2021.01); *F41H 3/02* (2013.01); *D10B 2501/00* (2013.01)

(56) References Cited

U.S. PATENT DOCUMENTS

| | | | | |
|---|---|---|---|---|
| 6,346,491 | B1 * | 2/2002 | DeAngelis | D04H 1/43828 442/318 |
| 10,203,183 | B2 | 2/2019 | Morag et al. | |
| 10,519,583 | B2 | 12/2019 | Moon | |
| 10,960,654 | B2 | 3/2021 | Morag et al. | |
| 2006/0067965 | A1 | 3/2006 | Chandra et al. | |
| 2018/0030599 | A1 | 2/2018 | Stremsdoerfer et al. | |
| 2018/0066921 | A1 * | 3/2018 | Wagner | B32B 7/02 |
| 2019/0017785 | A1 * | 1/2019 | Morag | B32B 5/06 |

FOREIGN PATENT DOCUMENTS

| | | | |
|---|---|---|---|
| JP | 2008223189 | A | 9/2008 |
| KR | 1020050094272 | A | 9/2005 |
| KR | 1020120029217 | A | 3/2012 |

OTHER PUBLICATIONS

Non-Final Office Action from related U.S. Appl. No. 17/400,999, dated Nov. 3, 2023, 7 pages.

* cited by examiner

METALIZED FABRIC THAT DISSIPATES AND SCATTERS INFRARED LIGHT AND METHODS OR MAKING AND USING THE SAME

CROSS REFERENCE TO RELATED APPLICATION(S)

This Application claims the benefit of U.S. Provisional Patent Application Ser. No. 62/966,855, filed Jan. 28, 2020. The entire disclosure of all the above documents is incorporated herein by reference.

BACKGROUND OF THE INVENTION

1. Field of the Invention

This disclosure is related to the field of metalized fabrics. More particularly, this disclosure is related to metalized fabrics that dissipate and scatter infrared light to provide infrared deception abilities and methods of making and using the same.

2. Description of the Related Art

Humans have used various forms of camouflage for thousands of years. Camouflage may be the use of any combination of materials, coloration, or illumination for concealment, either by making persons or objects hard to see or detect (also known as crypsis), or by disguising them as something else (mimesis). Camouflage, as used herein, will focus on the former type of camouflage, which has the goal of making persons or objects hard to see or detect. Objects, as used herein, will refer to persons and other tangible things. Often, camouflage is used to visibly conceal someone or something so that the camouflaged subject may remain unnoticed or unrecognized for its nature (e.g., being recognized as being a person) by observers. Such concealment is typically intended to conceal something or someone from being detected by a person or system that senses using visible light. As human vision, a visible light detection system, is typically the most advanced human sense, visible light detection (and thus visible light concealment) has been paramount in camouflage for centuries.

Visible camouflage, as used herein, is focused on providing visible deception to observation via visible light. Typically, such visible camouflage is capable of preventing or reducing the chances of detection by someone using eyesight to observe the area where the camouflage is being used. Human eyes are capable of detecting what is commonly called "visible light," or light having a wavelength of about 380 nm to about 740 nm. An observer may detect an object or person by detecting differences between the reflected light from the object or person being observed and the light reflected from the background of that object or person. In all cases, the observer will be observing within the visible light spectrum and objects that are opaque to (and reflective of) visible light.

One of the most important aspects of camouflage is often not that an object be unable to be individually identified, as would be the case with a disguise, but that the object being camouflaged reflects light in a fashion corresponding to a situation as if the object was not there. This typically means mimicking the background of the object, or portraying the object as a different object, so that light reflected from the object appears the same as light reflected off the background of the object or off the object the camouflaged thing is supposed to be "seen as." Said another way, ideally camouflage would mirror the appearance of the background that resides directly beyond the object along the line that extends from an observer through the object. In such a perfect scenario, which is often the subject of science fiction stories and movie making special effects, the object would truly be "invisible" to an observer as the camouflage perfectly represents the appearance of the background or allows the user to "see through" the object as if it was not there.

It is important to recognize that in practical situations visible light camouflage is often not designed to completely hide the observed thing (e.g., as would be the case if it was wholly placed into a cave or other hideout) or to make it "invisible" as discussed above, but instead to allow it to be seen but not identified for what it is, or, more often, that it is unnatural to the environment in which it is placed. The United States military (as well as hunters and others with similar goals of being undetected) has long used visible camouflage to protect military equipment such as vehicles, guns, ships, aircraft, and buildings, as well as individual soldiers and their positions. Generally, the purpose of the visible camouflage in military applications is to prevent military persons or things from being noticed or observed by current or potential enemies or combatants who are using eyesight (or the visible light spectrum) to detect the subjects being visibly camouflaged. Visible light camouflage can also be used to obscure the object in a manner that makes it difficult to target or attack with a weapon because it is difficult to distinguish the boundary of the object being targeted or, in more modern scenarios, difficult for algorithmic targeting systems which use light reflection to locate it.

In most cases, paints are applied to the subjects being visibly camouflaged to make the colors of the subject blend into their surroundings and to break up a silhouette of an object in a way that makes it more difficult to detect that it is a military asset. These colors will often be arranged in at least partially irregular patterns to mimic the surroundings or at least to decrease the likelihood that any shape or structure seen will be identified by an observer as a military asset. A common adage for camouflaging in natural environments is that most natural environments have few, if any, straight lines and, thus, the use of painting techniques which conceal the straightness of edges of manmade objects are common. The paint may also be supplemented with materials, such as local grasses or plant life, to improve the process of blending into the background and breaking up a silhouette. In other cases, such as in the case of military uniforms or fatigues, the material itself may be painted or dyed to resemble the background of the intended deployment of the military personnel. In all cases, these prior visible camouflages are intended to provide visible deception in the visible light spectrum.

Because visible camouflage is often designed to mimic a particular area, landscape, background, or terrain, many different visible camouflage patterns and colors have been used. For example, visible camouflage for military uniforms intended to be deployed in a jungle environment typically feature swaths of greens and browns to mimic the flora found in a jungle. On the other hand, camouflage for military uniforms intended to be deployed in a snowy environment typically feature swaths of whites and greys to mimic the snow, ice, and rock found in snowy environments. Accordingly, prior visible camouflage may be somewhat limited in its application.

Visible camouflage is not the only means of visible deception. Another form of visible deception is simply operating in the dark. As mentioned above, generally, humans can only observe an object through light reflected off the object and background being observed. This includes observation of contrast between the object being observed and the background of the object. For example, a person holding a mirror cannot be directly observed, due to the mirror's ability to reflect incoming light and the mirror's opacity to visible light. However, to the extent that the observed image in the mirror is different from the background of the mirror, the presence of the mirror may be observed via contrast, which itself may serve to identify the mirror (camouflage) as unnatural and result in it being detected even though the mirror has perfectly concealed whatever is on the other side of it. In the dark, there is no or only little light available for reflection. Accordingly, due at least to a lack of light reflections and related contrast, objects may go unnoticed by an observer when operating in the dark.

One limitation of prior visible camouflages (and merely operating in the dark) is that visible camouflages are only designed to camouflage the user in the visible light spectrum. Visible camouflages typically do not sufficiently mask or conceal other emissions by the camouflaged object. For example, a running vehicle will emit sound waves due to vibration of components, and will emit infrared light or heat from internal friction or combustion. Both the sound waves and infrared emission, while undetectable to human vision in most cases, may be detected by observation systems currently used in many military environments designed to detect such emissions. Sound and infrared light emission provide for different camouflage problems and suppression of infrared light emission to avoid detection systems is a near universal problem for those interested in effective camouflage.

All matter that has a temperature greater than absolute zero will emit thermal radiation in the form of light, much of which will be within the infrared spectrum (i.e., light having a wavelength of about 700 nm to about 1 mm). Warm materials, such as warm vehicle engines and human bodies (and, in fact, any warm blooded animal) often emit infrared light that is different, and distinguishable, from materials at ambient temperature, which often includes the background or landscape around a vehicle or person. As a result, infrared cameras and similar sensing equipment may be able to locate a person or vehicle in an area being observed even if the person or vehicle is using visible camouflage and is effectively invisible to an observer sensing visible light. Thus, even the best visible light camouflage may be easily defeated by infrared sensing equipment that today has become relatively inexpensive and ubiquitous in its application.

Prior attempts at making infrared camouflage are known. Early infrared camouflage typically blocked infrared light emitted by the wearer of the infrared camouflage. For example, metallic cloths that are opaque to infrared light have been used as infrared camouflage. These metallic-cloth-based infrared camouflages have some limitations, especially because these materials typically create an infrared shadow, which may itself be observed. An infrared shadow, as used herein, is the result of the metallic cloth reflecting all of the infrared light from the surroundings of the metallic cloth. This complete reflection is typically not natural and while it can hide the individual using the cloth by hiding their infrared emissions, its reflection of other infrared emissions from the rest of the environment, may make the wearer of the metallic cloth appear to not be a part of the general surrounding environment. Specifically, if an area behind the wearer is either hotter or colder than the surrounding environment being reflected by the metallic cloth, it may be clear to an observer using infrared sensing equipment that an object is passing in front of that hotter or colder region creating a negative image. In other words, the metallic cloth may create a significant contrast between the metallic cloth and the background at the location of the metallic cloth which contrast can itself defeat the benefit of infrared reflection.

This problem is due, in part, to the fact that the metallic cloth essentially reflects what is behind the wearer away from the observer and reflects what is in front of the wearer back at the observer. This is necessary to allow the cloth to reflect the wearer's emitted infrared light back toward the wearer and away from the observer. Therefore, any differences in temperature between the background and the foreground of the wearer may expose the wearer to infrared sensing equipment and/or observation in the same way that carrying a mirror may result in detection in the visible light spectrum even though the individual carrying the mirror is technically hidden. In effect, an infrared shadow results in detection because the void of infrared detection created by such a metallic cloth is itself unnatural and detectable.

A further limitation for such metallic cloths is that the metalized cloth itself cannot be readily dyed or easily printed on, so the metallic cloths are generally very visibly conspicuous. In some instances, metallic cloths may be screen printed on, but the screen printing process often makes the metallic cloths overly stiff. Further, the available colors for printing typically must be very dark, due to the relatively dark coloring of the metallic cloth itself. Thus, many of the most effective cloths for infrared camouflage are very poor at visible light camouflage.

Other prior infrared camouflages exist. An exemplary prior infrared camouflage is described in U.S. Pat. No. 10,203,183, the entire disclosure of which is incorporated herein by reference. According to this patent, a multilayer fabric may be used to provide some infrared camouflage. The multilayer fabric includes a cotton layer and an underlying layer including glass microballoons, which microballoons may scatter infrared light. This material is similar to the metallic cloth discussed above, and as a result, also has similar limitations. For example, the multilayer fabric is relatively stiff. Moreover, the material will create an unwanted infrared shadow, which may be detectable.

Another example of a prior infrared camouflage is described in U.S. patent application Ser. No. 16/025,642, the entire disclosure of which is incorporated herein by reference. In this patent application, in one embodiment, a multilayer fabric is used to provide some infrared camouflage. The multilayer fabric includes a base fabric, a thin metallic coating, and printed layer. The thin metallic coating reflects some infrared light, while the printed layer provides some visible camouflage. This multilayer fabric again is similar to the metallic cloth discussed above, and as a result, also has similar limitations. For example, the multilayer fabric is relatively stiff. Moreover, the material will create an unwanted infrared shadow, which may be detectable.

In another embodiment described in U.S. patent application Ser. No. 16/025,642, a metallic-coated thread may be woven together with a similar but uncoated thread to create a fabric that may dissipate and scatter infrared light. This woven fabric may be more ductile than the other prior infrared camouflages discussed above. Further, this woven fabric may help scatter background infrared light around the material itself, helping to blur any infrared shadow created by the masking of the infrared light emitted by the wearer and the background.

However, this woven fabric has its own limitations. For example, the woven fabric requires the use of metalized thread, and metalized thread may be very expensive and relatively inefficient to produce, at least because the metallization must occur at the thread stage of clothing production and not at the fabric or garment stages. Accordingly, the process of making the final woven material and subsequent garment may be relatively inefficient and expensive. Further, such a material must be woven, and will typically be woven using a weave that is an unbalanced weave having a ratio of, for example, 3:1 of one type of thread to the other on a given side of the woven fabric. This unbalanced weave places a majority of the metalized thread (three times more metallic thread than uncoated thread, for example) on one side of the weave.

The other side of the weave, however, will also include a significant amount of metallization due to the metal thread occupying some space on that other side (about one quarter of the side will be metallic thread). This limits the fabric maker's ability to dye and/or print on either side of the weave, at least because such techniques poorly adhere to metallic threads. Further, printing on metallic thread typically requires the use of darker pigmentation because otherwise the metallic thread will shine though the printing material. Accordingly, it may not be possible to print lighter colors on this woven fabric, even if the fabric maker and/or end-user desires a lighter printing scheme. It also generally means that the more heavily metalized side of the fabric needs to be placed on the inside if any form of visual camouflage is to be applied to the outside.

In summary, the prior attempts at making infrared camouflage discussed above have limitations. For example, the multilayered materials are typically formed using glues, resins, or other materials that are stiff and unbreathable. Accordingly, the resulting fabrics and garments themselves are typically stiff and unbreathable. Further, the presence of glue, resins, and other materials may reduce the fabric's ability to mask or scatter infrared light. The stiffness may also create issues when attempting to form garments from the fabric. As a result, such garments are typically limited to ponchos and other garment designs that are not form fitting and do not move with the movements of the garment wearer. Further, these materials typically result in garments that are relatively uncomfortable to wear. For woven materials, such materials have some improved properties, but have other drawbacks. These drawbacks include additional expenses and difficulties in printing and dying the woven material.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, are metalized fabric and methods for metallization of fabric. The fabric is formed using two threads with different affinities for metallization, but which threads are not metalized prior to forming into the fabric. The threads will typically be woven using an unbalanced weave to provide one side of the fabric with a resultant greater amount of metallization than the other but this is not required. Once the resultant fabric is metalized, it will typically be more balanced in metallization and can be more suitable for consistent color dying than fabric which was formed from both metalized and unmetallized threads.

There is described herein, in an embodiment, a method for producing a partially metalized fabric, the method comprising: providing a first thread having a first affinity for metallization; providing a second thread having a second affinity for metallization, the second affinity being greater than the first affinity; forming the first thread and the second thread into a fabric; and metalizing the fabric so that the first thread and the second thread are both metalized to different amounts.

In an embodiment of the method, the forming comprises weaving the first thread with the second thread.

In an embodiment of the method, the weaving creates an unbalanced weave with more of the first thread on a first side and more of the second thread on an opposing second side.

In an embodiment of the method, the fabric is formed into a garment with the first side on an inside of the garment and the second side on an outside of the garment.

In an embodiment of the method, the fabric is formed into a garment with the first side on an outside of the garment and the second side on an inside of the garment.

In an embodiment of the method, the weaving creates a balanced weave with a generally equal amount of both the first thread and the second thread on both the opposing sides.

In an embodiment of the method, both the first thread and the second thread each have some metallization after the metalizing.

In an embodiment, the method further comprises dying the metalized fabric after the metallization.

In an embodiment of the method, the first thread comprises nylon.

In an embodiment of the method, the second thread comprises polyester.

In an embodiment of the method, the second thread comprises a treated nylon.

In an embodiment of the method, the metallization comprises autocatalysis.

In an embodiment of the method, the metalized fabric serves to scatter infrared (IR) waves incident on the fabric.

There is also described herein, in an embodiment, a fabric for scattering infrared (IR) radiation, the fabric comprising: a first thread having a first affinity for metallization; and a second thread interwoven with the first thread to form a fabric, the second thread having a second affinity for metallization, the second affinity being greater than the first affinity, wherein the fabric is metalized so that the first thread and the second thread are both metalized to different amounts.

In an embodiment of the fabric, the fabric has more of the first thread on a first side and more of the second thread on an opposing second side.

In an embodiment of the fabric, the fabric is formed into a garment with the first side on an inside of the garment and the second side on an outside of the garment.

In an embodiment of the fabric, the fabric is formed into a garment with the first side on an outside of the garment and the second side on an inside of the garment.

In an embodiment of the fabric, the fabric has a generally equal amount of both the first thread and the second thread on each opposing side.

In an embodiment of the fabric, both the first thread and the second thread each have some metallization after the metalizing.

In an embodiment of the fabric, the first thread comprises nylon and the second thread comprises polyester.

DETAILED DESCRIPTION OF THE PREFERRED EMBODIMENT(S)

Figure 1:
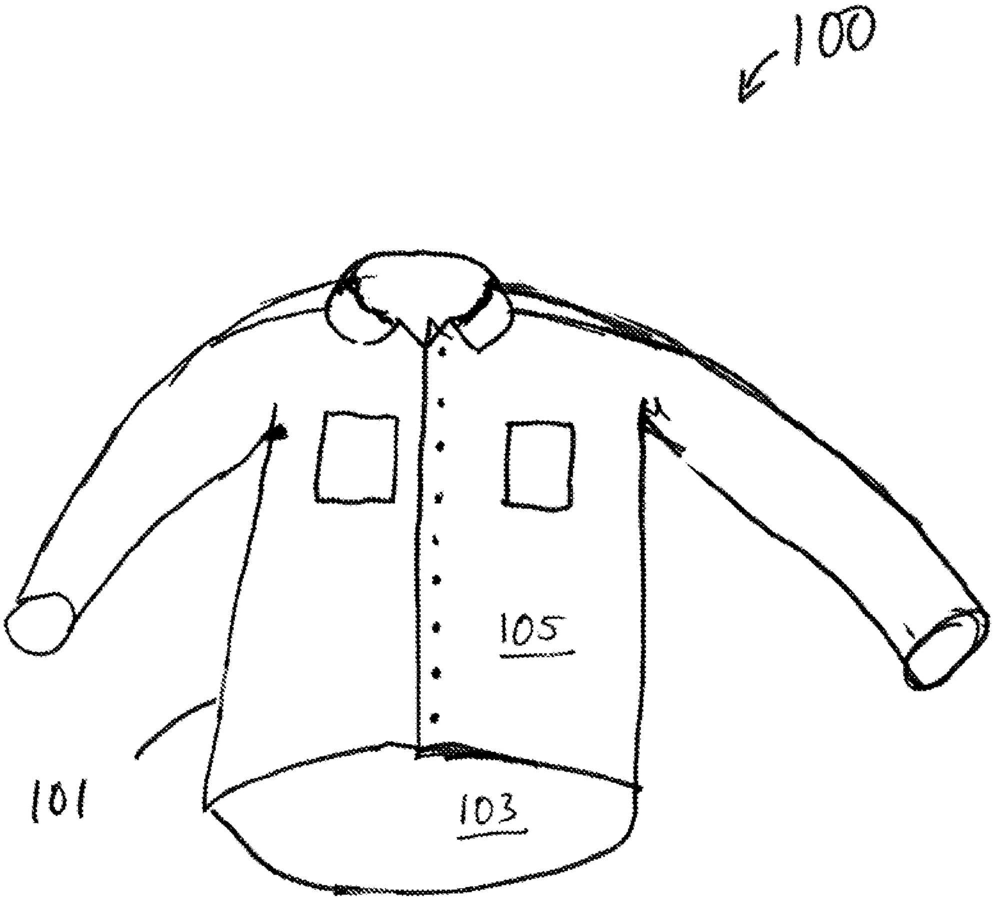
FIG. 1 depicts a perspective view of a garment made using an embodiment of a woven metalized fabric that serves an infrared deceptive camouflage.

The following detailed description and disclosure illustrates by way of example and not byway of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

This disclosure primarily relates to infrared light dissipating and scattering fabrics although fabrics which scatter or dissipate other forms of electromagnetic radiation (including visible or ultraviolet light) are also contemplated. Such fabrics may also shift the wavelength of infrared light (or other light) emitted by a wearer of (or other object placed under) the fabric. Further, such fabrics may be metalized after or during construction of the fabric without requiring the use of previously metalized filaments, fibers, threads, or yarns (all considered to be “threads” as used herein).

Throughout this disclosure, the inventions of this application will primarily be described as pertaining to a weave or a woven material. This focus on woven fabrics allows for the clear illustration of some of the embodiments of the inventions disclosed herein. For example, the use of an unbalanced weave provides an appropriate illustration of how materials having different affinities to metallization may be used together to make useful fabrics. However, this description is not intended to be limited only to weaves and woven material. Materials and fabrics within the scope of this disclosure include without limitation any materials woven, knitted, bound, bonded, crocheted, knotted, tatted, felted, braided, or otherwise formed. Such materials include fabrics or other materials formed by application of heat and/or pressure to filaments or other materials. For example, and without limitation, this application includes within its scope non-woven materials made to form fabrics that are not woven or knitted, such as felts. Accordingly, as would be appreciated by a person of ordinary skill in the art, the teachings herein are applicable to fabrics made by any method known to persons of ordinary skill in the art.

Further, a person of ordinary skill in the art will recognize some of the potential benefits of embodiments of fabrics made in accordance with this disclosure. Generally, by metalizing filaments, fibers, threads, or yarns after weaving, knitting, or other processing, certain benefits may be had. For example, weaving fabrics using metalized threads may increase maintenance costs associated with weaving machinery. This may be because metalized threads may be more abrasive than non-metalized threads, leading to increased wear on thread-handling portions of weaving machinery. This increased wear may lead to increased maintenance costs as machine parts need to be replaced or otherwise maintained more frequently. This increase in maintenance may, in some cases, lead to additional machine downtime, which downtime may have its own associated costs.

Further, because metalized threads may be more abrasive, weaving them with other threads may result in sticking between threads, which may result in imperfect weaves. In some cases, the metalized threads may even damage adjacent threads during fabric weaving. In addition, metalized threads may be more expensive to handle and manage than non-metalized threads, at least due to their increased weight. Finally, metalized threads may be limited in the number of processing steps that they may be subjected to due to their abrasiveness and/or their relatively hard outer surfaces. For example, many fabrics are dyed or scoured after being woven. Such dying or scouring processes may not be performed on metalized threads because either the processes would be ineffective (such as in the case of dying), the threads may damage related machinery (such as in the case of scouring), the threads may be damaged by the processing, or due to other factors. Accordingly, the ability to metalize fabrics at a later stage of processing the fabrics will often have a number of advantages over the use of metalized thread.

FIG. 1 depicts a perspective view of a garment (100) made using an embodiment of a woven metalized fabric (101) that serves an infrared deceptive camouflage. The woven metalized fabric includes a first surface (103) and a second surface (105) that is opposite to the first surface (103). The woven metalized fabric (101) may be made from any material, but it will always include at least two types of thread, with each type of thread having different affinities for being metalized. For example, the two threads may be different materials, such as one being nylon and the other being polyester. As another example, one thread may be untreated nylon and the second may be nylon that has been treated to increase the thread’s affinity for being metalized by, for example, increasing surface roughness. Moreover, more than two different types of thread may be used. In an embodiment, three or more different materials, each having their own affinity for being metalized, may be used. In other embodiments, some materials may have the same or similar affinities for metallization, while that affinity being different from other materials used. For example, a fabric may be made from three materials, one having a low metallization affinity, another having a medium affinity for metallization, and another having a high affinity for metallization.

In any case, the threads may be made from cotton, nylon, polyester, spandex, and/or another material known to persons of ordinary skill in the art or any combinations of these materials. In an embodiment, the woven metalized fabric (101) may be made from nylon and polyester threads. In another embodiment, the woven metalized fabric (101) may be made from nylon, polyester, and another material such as, but not limited to, polyether-polyurea copolymer (e.g. spandex) threads. Each thread may be used in equal or unequal amounts in the woven metalized fabric. Further, each thread will typically include only a single material, but this is by no means required and a thread may comprise filaments of multiple materials with the same or different affinities for metallization.

The two or more threads may be woven together to form an intermediate woven material. The resulting weave may have any thickness. For example, a weave having two threads may have a thickness equal to about two threads’ width. However, such a weave with two threads may have a greater or lesser thickness. Further, a thread having three threads may have a thickness equal to about three threads' width. Again, such a weave with three threads may have a greater or lesser thickness. Further, the various threads may be distributed in any combination, pattern, or other arrangement throughout the various layers. For example, and without limitation, three threads in a three layer thick fabric may be each confined to their layer, evenly distributed throughout each layer, or unevenly distributed throughout some or all layers.

Figure 2:
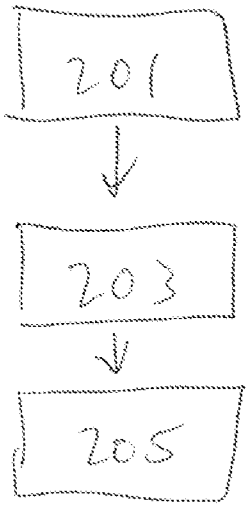
FIG. 2 depicts a flow chart of a process for making a woven metalized fabric.

FIG. 2 depicts a block diagram of an embodiment of a method of making an embodiment of a woven metalized fabric (101). The first step (201) of the method depicted in FIG. 2 is to select the threads to be used. The second step (203) of the method depicted in FIG. 2 is to weave the selected threads together to form the intermediate woven material. The weave used to produce the intermediate woven material may be any weave known to persons of ordinary skill in the art to produce an unbalanced weave, which unbalanced weave features a first thread predominantly on a first side of the intermediate woven material and a second thread predominantly on a second side of the intermediate woven material that is opposite the first side. In an embodiment, the first side of the intermediate woven material will feature a nylon thread and the second side of the intermediate woven material will feature a polyester material. Once woven, this intermediate woven material will be metalized in a third step (205) of the method depicted in FIG. 2.

The intermediate woven material may be metalized (a) immediately after being woven, while other portions of the intermediate woven material are being woven, (b) after an entire length of intermediate woven material has been woven, (c) after some portions of the intermediate woven material have be subsequently processed in any way, (d) after some portions of the intermediate woven material have been processed into a garment, (e) or at some other time subsequent to at least some of the intermediate woven material being woven. In any case, all threads of the intermediate woven material will be subjected to metallization. Any metallization process known in the art may be used, but in any case, the metallization process will preferentially, and may exclusively, metalize the second thread over the first thread. In some embodiments, the metallization process will use autocatalysis to coat the intermediate woven material with a metal.

In such an embodiment of a method that uses autocatalysis to metalize the intermediate woven material, or even a portion of the intermediate woven material, the intermediate woven material may be immersed in a bath of metal salts and a reducing agent, along with complexing agents, stabilizers, and buffers that may enhance the autocatalytic process and/or maintain the necessary pH for the process. In an embodiment, the metal deposited on the intermediate woven material is silver. In other embodiments, the metal may be any metal that provides for the refection and scattering of infrared light.

In any case, the metalizing process will preferentially metalize the second thread over the first thread. For example, in an embodiment that includes nylon and polyester threads, the first thread may be polyester and the second thread may be nylon. Some of the first thread of polyester may be metalized, such as by having a thinner layer of metallization, a more patchy layer of metallization, or having metalized and unmetalized threads, but the second thread of nylon will be metalized to a greater extent typically by having more of the total thread metalized and/or metalized with a thicker, more consistent, layer of metal.

The end product will be woven metalized fabric (101). Any other steps known to persons of ordinary skill in the art may be included in the method depicted in FIG. 2. Further, the steps may be performed in any order. In an embodiment, the first step (201) is performed first, the second step (203) is performed second, and the third step (205) is performed third. In such an embodiment, there may be other steps performed before or after any of the first through third steps.

Returning to FIG. 1, the depicted embodiment of the woven metalized fabric (101) may be used to fabricate a garment (100). The garment (100) may be made using the woven metalized fabric (101) such that the first threads (of less metalized material) predominately form the inner first surface (103) and the second threads (of more metalized material) predominately form the outer second surface (105). This allows the second surface (105) to better mask the infrared light emitted by the wearer due to the second surface's (105) infrared reflection and opacity properties. Further, the second surface (105) may increase a wearer's ability to deceive infrared observation by scattering infrared light around the wearer's silhouette (or infrared shadow), which scattering may obscure or blur the wearer's silhouette (or infrared shadow) when viewed from infrared sensing equipment. Further still, the woven metalized fabric (101) may be capable of shifting the wavelength of the infrared light emitted by the wearer, which shift may also assist in increasing a wearer's ability to deceive infrared observation. Such a shift in the wavelength of the emitted light may assist in blending the emitted light into the background light, helping to mask the wearer's infrared shadow.

Moreover, the second surface (105) made mostly from the second more metalized thread may still be dyed or printed upon to increase the garment's (100) ability to deceive visible observation. In prior fabrics, if the second surface (105) were metalized, dying and printing would be overly difficult at least because metal threads typically do not retain dye or printing materials well, as discussed above. However, using the processes and materials discussed herein, the second surface (105) may be readily dyed. In some embodiments, this is due to the relatively lightly-colored nature of the second surface (105) when compared to metalized surfaces of prior fabrics. In alternative embodiments, it may be because the presence of metallization on the less metalized threads presenting surfaces in both threads which accept at least some level of dye, even if different.

In other embodiments, the positioning of the metalized thread may be reversed. That is that the outer surface of the resultant woven material may include less of the thread having greater affinity than the inner surface. In effect, the first surface (103) and the second surface (105) may be the opposite from what is shown in FIG. 1, such that the first surface (103) is on the exterior of the garment and the second surface (105) is on the interior of the garment. In a still further embodiment, a balanced weave may be used between the two threads such that the metallization is essentially equally distributed between the first surface (103) and the second surface (105) in the resultant garment. These types of fabrics may be desired where increased skin contact with the metallization may be desired. Regardless of which side of the fabric has more or less metallization affinity, it should be recognized that the specific weave may also be selected to provide the thread with greater affinity for metallization with a particular pattern within the resultant fabric. This pattern may provide for improved blocking or dissipating of infrared light compared to a different pattern of metallization and/or may provide for the ability to use the metallization to dye such patterns into the resultant fabric.

Moreover, the process of metalizing the threads after being woven can result in less metal being applied to the less metalized side than would be true if a metalized thread were used to make the fabric and/or less metal being used in total. For example, the points of contact between threads may get metalized less (or not at all) compared to those points that are not in contact with another thread. This arrangement can thus allow for specifically positioned metallization within the fabric. Further, preferential metallization of the resultant fabric instead of the utilization of metalized and non-metalized threads can result in less binary metallization. Specifically, as the preference for metallization between the two threads will generally not be binary (that is one thread will 100% metalize while the other does not metalize at all), the difference in metallization between any two threads in any small section of the fabric can actually be closer together than the metallization between threads in the fabric overall. This may allow for better printing and/or dying on the more metalized side of the fabric as there can be less color distinction between the threads. Thus, the metalized threads do not "stand out" from the other threads nearly as much.

This alteration and increased similarity between the threads can allow the garment (100) to include prior visible camouflage patterns and colors dyed or printed on the second surface (105) to decrease the wearer's visibility to observers that are not possible on a fabric from two distinct thread types where one is metalized and the other is not. To use as an example in a fabric with 100% metalized threads and 0% metalized threads, a dye may dye the 0% metalized threads a selected color (e.g. bright green) and fail to dye the metalized threads at all. This can result in the metalized pattern being completely visible in the fabric as the typically silver metalized threads are in stark contrast to the bright green threads. In effect, the fabric would appear as a patterned fabric. However, in a fabric with 80% metalized threads and 20% metalized threads, the 80% metalized threads may be dyed a light green while the 20% metalized threads are dyed darker. This results in increased difficulty in seeing the pattern of the threads as the human eye will often blend the greens together. As a result, the garment (100) may improve the wearer's ability to be both visibility and infra-red deceptive.

In other embodiments, the woven metalized fabric (101) may not be formed into a garment, but instead, may be used as a covering for a vehicle. In some embodiments, a large tarp of the woven metalized fabric (101) may be used to cover some or all of a vehicle intended to be camouflaged. In this case, the vehicle may be made more difficult to detect from both visual and infrared observation. In other embodiments, the woven metalized fabric (101) may be integrated into the vehicle. For example, the woven metalized fabric (101) may be used as a covering or external layer of the vehicle being camouflaged.

In other embodiments, structures may be fabricated using the woven metalized fabric (101). In such a case, the woven metalized fabric (101) may be used to form an outer shell of the structure, which may be a tent or any other structure. Such a structure may allow for the camouflaging of materials, persons, equipment, or other resources to avoid their detection.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The qualifier "generally," and similar qualifiers as used in the present case, would be understood by one of ordinary skill in the art to accommodate recognizable attempts to conform a device to the qualified term, which may nevertheless fall short of doing so. This is because terms such as "orthogonal" are purely geometric constructs and no real-world component or relationship is truly "orthogonal" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A method for producing a metalized fabric, the method comprising:
- providing a first thread having a first affinity for metallization;
- providing a second thread having a second affinity for metallization, said second affinity being greater than said first affinity;
- weaving said first thread and said second thread into a fabric using an unbalanced weave with more of said first thread on a first side and more of said second thread on an opposing second side; and
- metalizing said fabric so that said first thread and said second thread are both metalized to different amounts.

2. The method of claim 1 wherein said fabric is formed into a garment with said first side on an inside of said garment and said second side on an outside of said garment.

3. The method of claim 1 wherein said fabric is formed into a garment with said first side on an outside of said garment and said second side on an inside of said garment.

4. The method of claim 1 wherein both said first thread and said second thread each have some metallization after said metalizing.

5. The method of claim 1 further comprising: dying said metalized fabric after said metallization.

6. The method of claim 1 wherein said first thread comprises nylon.

7. The method of claim 6 wherein said second thread comprises polyester.

8. The method of claim 6 wherein said second thread comprises a treated nylon.

9. The method of claim 1 wherein said metallization comprises autocatalysis.

10. The method of claim 1 wherein said metalized fabric serves to scatter infrared (IR) waves incident on said fabric.

* * * * *